Figure 1:
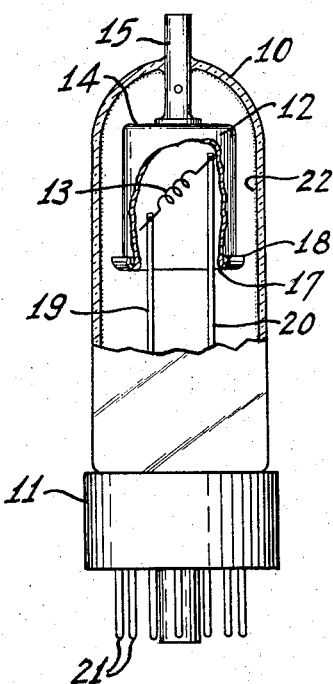

March 10, 1959  J. L. GALLUP  2,877,143
METHOD OF TREATING GLASS
Filed Nov. 20, 1956

INVENTOR.
JOHN L. GALLUP
BY
William A. Zalesak
ATTORNEY

United States Patent Office
2,877,143
Patented Mar. 10, 1959

2,877,143

METHOD OF TREATING GLASS

John L. Gallup, Bloomfield, N. J., assignor to Radio Corporation of America, a corporation of Delaware Application November 20, 1956, Serial No. 623,500

17 Claims. (Cl. 117—211)

This invention relates to a lime glass article and to a method of treating lime glass to improve its electrical properties and, though not limited thereto, is herein described with reference to a lime glass vacuum tube envelope and to a method of improving the service life characteristics of the same.

This application is a continuation-in-part of my co-pending application, Serial No. 537,418, filed September 29, 1955, and now abandoned, and assigned to the assignee of this application.

Glass envelopes utilized in high voltage electron tubes have been found to deteriorate rapidly. It is believed that the deterioration of the envelope is caused by electron bombardment which induces chemical changes in the glass, thereby weakening it.

It has been previously found that the deterioration may be minimized by coating or otherwise treating the glass envelopes to reduce the resistivity of the interior surfaces thereof. However, coatings produce too low electrical resistivity and give rise to arc-over due to short circuits to the glass. As to previous treating techniques, other than coatings, these techniques require the use of a lead glass workpiece and include the firing of the glass in hydrogen to reduce some of the lead in the glass to a metallic form and thus provide an interior envelope surface having the desired order of conductivity. However, this technique is not available when lead-free glass workpieces, such as lime glass workpieces, are used. But the use of lead glass workpieces has proven relatively expensive since a lead glass workpiece is more costly than a lime glass one; at present prices a lead glass bulb costs about 10 times as much as a comparable lime glass one.

It is thus an object of the invention to provide an improved lime glass article having improved electrical properties and an improved method of making the same.

It is another object of the invention to provide an electron tube envelope having improved service life characteristics, and more particularly to provide a relatively inexpensive electron tube envelope which is at the same time free from tendencies toward arc-over and deterioration upon electron bombardment, and an improved method of making the same.

According to one aspect of the invention a lime glass article is provided having dispersed lead atoms or ions adjacent to a surface of the article subjected to such bombardment. According to a method feature of the invention, such an article is made by firing the lime glass article in an atmosphere including a reducing gas and lead vapor. According to another method feature of the invention, a lead vapor and reducing gas atmosphere is heated in one furnace to a relatively high temperature, say 650° C. and then passed into a second furnace containing the lime glass bulb to be treated, the second furnace being heated to a temperature which is below the deformation temperature of the bulb. It has been found that lead atoms, on contacting the cooler bulb, condense out of the preheated atmosphere and become dispersed in the surfaces of the bulb exposed to the atmosphere.

Although it is not fully understood why the inclusion of the lead in the glass surface reduces the tendency of the surface toward deterioration, it is believed that the lead prevents the build-up of localized electrical charges, increases the envelope surface resistance to chemical attack, and increases the mechanical strength of the envelope. The reduced electrical resistance imparted to the glass, of the order of 100,000 megohms per unit square, as distinguished from a resistance of the order of over 300,000 megohms per unit square for untreated articles, apparently permits a dispersion of electrical charges across the surface thereby preventing electrolysis of the glass due to high charge concentrations on the glass envelope. This reduced resistance, however, is still adequate to prevent arc-over. The treatment of the glass according to the invention enables the envelope to withstand, throughout the normal life thereof, not only appreciable mechanical stresses imparted thereto by high voltage conditions within the tube, but also mechanical shock encountered in handling the tube. Electron tubes having lime glass envelopes manufactured in accordance with the invention have successfully passed tests involving voltages as high as 80,000 volts across different portions of the tube for a period of over 500 hours with no evidence of a weakening of the envelopes, while tubes processed in a similar manner but without the treatment according to the invention have failed after as little as two hours of operation.

Figure 2:
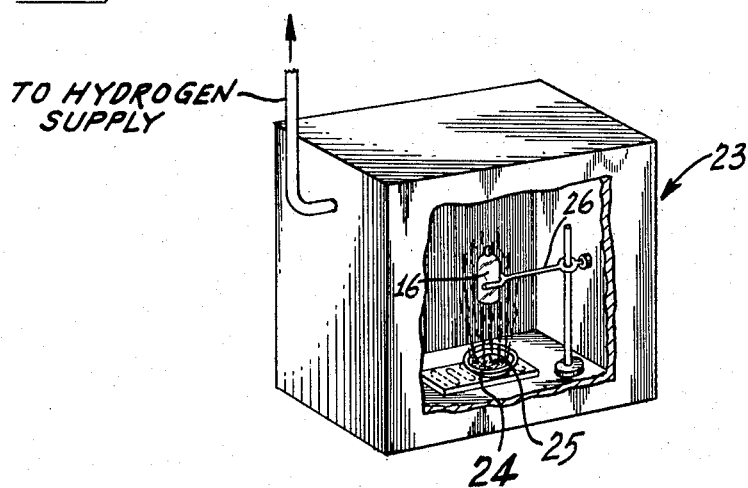

The invention is described in greater detail in connection with the accompanying drawing wherein:

Fig. 1 is a cut-away elevational view of an electron tube envelope made according to the method of the invention; and Fig. 2 is a cut-away perspective view of a furnace illustrating the firing of a glass article therein according to the method of the invention.

Referring now to the drawing in greater detail there is shown in Fig. 1 a high voltage electron tube of the type commercially known as type 1B3GT. The tube structure includes a lime glass envelope 10 having at one end thereof a base 11. Within the envelope referred to are mounted a tubular anode 12 and a filamentary cathode 13. The anode 12 is closed at one end 14. This end 14 is fixed to a tubular access terminal 15 for supporting the anode 12 within the tube. The other end 17 of the anode 12 is open. Adjacent to its open end 17, the anode 12 has outwardly flared edges 18 to prevent high charge concentration at this end. The cathode 13 may be fixed between supports 19 and 20 which are connected, at a position adjacent to the base end of the envelope, to appropriate ones of prongs 21 mounted on the base 11. According to the invention the interior surface of the envelope has lead 22 dispersed therein. The tube type referred to is a rectifier. The cathode 13 is operated at a predetermined reference potential and the anode is adapted to have an alternating current potential applied to it. In operation, the potential applied between the anode and the cathode is characterized by relatively large swings in the negative and positive directions.

In practicing the method of the invention, and in accordance with one feature thereof, the lime glass envelope 10 (Fig. 1) of a high voltage electron tube is treated by disposing a lime glass bulb 16 (Fig. 2) in a bulb treating furnace 23 and subjecting it to a firing operation wherein it is heated in an atmosphere containing a reducing gas, such as hydrogen, and lead vapor. The lime glass bulb 16 may, for example, be of the type known commercially as type No. 0080 Soda Lime bulb manufactured by the Corning Glass Works, Corning, New York, this bulb having an annealing point of 510° C., a softening point of 696° C., and a deformation temperature of over 500° C. The firing operation is carried on until the surface resistance of the bulb 16 is reduced to a resistance of the order of 100,000 megohms per unit square. The firing operation referred to apparently causes some of the lead from the lead vapor to become dispersed within the glass of the bulb, as indicated by numeral 22 in Fig. 1.

According to this method feature of the invention there is placed within the bulb treating furnace 23 an evaporating dish 24 containing lead metal 25. The temperature of the furnace is set at 350° C. in order to insure that lead vapor from molten lead in the dish 24 fills the chamber of the furnace (the melting point of lead being about 327° C.) and in order to avoid heating the lime glass bulb 16 to be treated to its deforming temperature. At this temperature of 350° C. the lead vapor has a vapor pressure in the neighborhood of $10^{-7}$ millimeters of mercury. The lime glass bulb 16 is supported within the furnace 23, as by a clamp 26, and fired in this atmosphere of hydrogen and lead vapor at 350° C. for about 20 minutes. Instead of lead metal 25, there may be placed in the dish 24 a lead compound of the type which gives off lead vapor when heated. Thus, lead acetate may be disposed in the dish 24 in place of the lead metal. When the lead acetate is heated in a reducing atmosphere, the compound forms a spongy mass of lead metal which rapidly evolves lead vapor. It has been found that the surface resistance of the glass, which was previously over 300,000 megohms per unit square, was reduced by this treatment to about 100,000 megohms per unit square.

When the temperature of the bulb treating furnace is lower than about 350° C. an increase in firing time is necessary in order to allow sufficient time for the lead from the furnace atmosphere to penetrate the glass. For example, when the firing temperature is reduced to where the vapor pressure of the lead is reduced to lower than the order of about $10^{-7}$ mm. of mercury, the firing time must be increased to about 3 hours in order to provide the desired envelope surface. In this case it is also preferable to use a spongy mass of lead metal to provide a relatively large surface area from which lead vapor may be given off.

According to another method feature of the invention the time required for treating the lime glass bulb 16 may be reduced to a period appreciably less than 20 minutes. While it has been found that it takes about 20 minutes for treatment of the bulb at temperatures in the neighborhood of 350° C., this time can be materially reduced by subjecting a bulb to lead vapor at a temperature appreciably above the deformation temperature of the bulb while preserving the bulb itself at a temperature lower than its deformation temperature. This is accomplished by preheating a lead vapor and reducing gas atmosphere in an atmosphere heating furnace to a relatively high temperature, say 650° C., and then passing this preheated atmosphere into a bulb treating furnace containing the lime glass bulb to be treated, the bulb treating furnace being heated to a temperature which is below that of the preheated atmosphere and below the deformation temperature of the bulb. It has been found that lead atoms, on contacting the cooler bulb, condense out of the preheated atmosphere and become dispersed in the surfaces of the bulb exposed to the atmosphere.

When the lead vapor and reducing gas atmosphere is preheated to a temperature of about 650° C., the lead has a vapor pressure of about $10^{-3}$ mm. of mercury which corresponds to a lead concentration in the preheated atmosphere about 10,000 times higher than the lead concentration at the aforementioned temperature of about 350° C. It has been found that this lead concentration causes the lime glass bulbs to acquire the desired amount of lead so quickly that the speed of moving the bulbs into and out of the treating furnace is in itself a material factor in determining this desired amount of lead. While the preheating may be carried out at a temperature higher than about 650° C., for example, a preheating temperature of 850° C. has been used, temperatures higher than about 650° C. are accompanied by a depositing rate involving a period so short that it becomes difficult to preserve the bulbs from an excessive lead deposit. In one example, where the lead and reducing gas atmosphere was preheated to a temperature of 650° C., a desired coating deposit of 100,000 megohms per square was obtained in 5 minutes, the 5 minutes including the time required for loading and unloading the bulb from the furnace.

The temperature of the bulb treating furnace should be preferably at least about 50° C. less than the deformation temperature of the bulb in order to assure that a heating of the bulb by the preheated atmosphere does not raise the bulb temperature to its deformation temperature. It has also been found that regardless of the temperature of the lead vapor, the glass bulb must be maintained at a temperature of over about 325° C. when subjected to the lead vapor in order to assure that the lead atoms penetrate into the surface of the glass and form the desired dispersion therein.

As has been explained, the resistance of the envelope to disintegration under electron bombardment is increased after the electrical resistance of the envelope is reduced to about 100,000 megohms per unit square. However, the surface resistance may be lower than this provided the resistance is not lowered to such an extent that the finished tube employing the treated envelope would, during normal operation, have a tendency toward arc-over between the envelope and the tube electrodes. Thus, for example, a surface resistance of the envelope of the order of 10,000 ohms per unit square is too high a conductivity for tubes, such as the aforedescribed 1B3GT, which are subjected to relatively high voltages.

Thus, it is apparent that the invention provides an improved electron tube wherein the envelope is characterized by the advantages of increased conductivity to prevent deterioration thereof but insufficient conductivity to allow arc-over. While the invention has been described with respect to an electron tube envelope, it will be appreciated that other articles, such for example as electrical resistors, may also be manufactured in accordance with the invention.

What is claimed is:

1. A method of treating a lime glass article to reduce its resistivity, said method comprising firing said article in a reducing atmosphere including lead vapor and having a temperature above about 325° C.

2. A method of treating a lime glass article to reduce its resistivity, said method comprising firing said article at a temperature of above the melting point of lead for at least 20 minutes and in an atmosphere having said temperature and including a reducing gas and lead vapor.

3. A method of treating a lime glass electron tube envelope, said method comprising firing said envelope for at least 20 minutes in an atmosphere including hydrogen and lead vapor and having a temperature above the melting point of lead.

4. A method of treating an electron tube lime glass envelope, said method comprising the firing of said envelope in an atmosphere of a reducing gas and lead vapor, said vapor having a pressure of the order of $10^{-7}$ mm. of mercury.

5. A method of making a lime glass electron tube envelope, said method comprising the firing of said envelope at a temperature below the melting point of lead for at least 3 hours in an atmosphere including hydrogen and lead vapor and wherein said vapor has a pressure of the order of $10^{-7}$ mm. of mercury.

6. A method of treating a lime glass article to reduce its resistivity, comprising heating said article in a reducing atmosphere containing lead vapor and having a temperature above about 325° C., to provide a lead coating on said article, while preventing the inclusion of oxygen in said coating.

7. A method of treating a lime glass article having a surface resistance of the order of 300,000 megohms per unit square to reduce its resistivity, said method comprising subjecting said article to a reducing atmosphere including lead vapor and having a temperature of about 325° C. for a period of time sufficient to reduce its surface resistance to the order of 100,000 megohms per unit square.

8. A method of treating a lime glass article to reduce its resistivity, said method comprising heating an oxygen-free atmosphere including lead vapor and a reducing gas to a temperature from about 350° to about 650° C. and then subjecting said article to said lead vapor for a length of time sufficient to provide a lead coating on said article having a resistance in the order of 100,000 megohms per unit square.

9. The method claim in claim 8, and wherein said article is maintained at a temperature below its deformation temperature while it is subjected to said atmosphere including said lead vapor and a reducing gas.

10. A method of treating a substantially lead-free glass article having a surface resistance greater than about 100,000 megohms per unit square to reduce its surface resistance, said method comprising heating said article to a temperature below its deformation temperature in a reducing atmosphere containing lead vapor for a period of time sufficient to reduce its surface resistance to about 100,000 megohms per unit square.

11. A method of treating a substantially lead-free glass article to reduce its surface resistance, comprising heating said article to a temperature above about 325° C. and below its deformation temperature in a reducing atmosphere containing lead vapor for a period of time sufficient to reduce its surface resistance to the order of 100,000 megohms per unit square.

12. A method of treating a lime glass article to reduce its resistivity, said method comprising heating lead vapor to a temperature higher than the deformation temperature of the lime glass article to be treated and then subjecting said article to said lead vapor and a reducing gas while maintaining said article at a temperature below its deformation temperature.

13. A method of treating a lime glass article having a surface resistance greater than about 100,000 megohms per unit square to reduce its surface resistance, said method comprising heating said article to a temperature below its deformation temperature and above about 325° C. in a reducing atmosphere containing lead vapor for a period of time sufficient to reduce its surface resistance to about 100,000 megohms per unit square.

14. A method of treating a lime glass article to reduce its surface resistance, comprising heating said article to a temperature above about 325° C. and below its deformation temperature in a lead vapor reducing atmosphere heated to a temperature above said deformation temperature for a period of time sufficient to reduce its surface resistance to the order of 100,000 megohms per unit square.

15. A method of treating a lead-free glass workpiece to reduce its surface resistance, comprising first heating an atmosphere containing lead vapor and hydrogen gas to a temperature of at least about 650° C., and then subjecting said workpiece to said atmosphere while preserving said workpiece at a temperature below its deformation temperature and above about 325° C.

16. Method of treating a lime glass article to reduce its surface resistance, comprising heating in one furnace an atmosphere including lead vapor and reducing gas to a temperature from 500° C. to 650° C., for preheating said atmosphere, and passing the pre-heated atmosphere to a second furnace containing said lime glass article, said second furnace being cooler than said pre-heated atmosphere passed to said second furnace, whereby said glass article is cooler than said preheated atmosphere and the lead vapor in said atmosphere condenses on a surface of said article for reducing its surface resistance while preserving said glass article from softening deformation.

17. Method of treating a lime glass article to reduce its surface resistance, comprising heating in a first furnace an oxygen-free atmosphere including lead vapor and a reducing gas to a temperature of from 500° C. to about 696° C., for preheating the same, heating said glass article in a second furnace to a temperature below the deformation temperature of said article, passing said preheated atmosphere to said second furnace, whereby said lead vapor in said preheated atmosphere condenses on a surface of said glass article, and removing said glass article from said second furnace before said article reaches its said deformation temperature.

References Cited in the file of this patent

UNITED STATES PATENTS

| | | |
|---|---|---|
| 236,833 | Nichols | Jan. 18, 1881 |
| 1,224,339 | Darrah et al. | May 1, 1917 |
| 1,710,747 | Smith | Apr. 30, 1929 |
| 1,635,320 | Heany | July 12, 1929 |
| 2,413,606 | Colbert et al. | Dec. 31, 1946 |
| 2,450,857 | Colbert et al. | Oct. 5, 1948 |
| 2,649,387 | Parsons et al. | Aug. 18, 1953 |
| 2,724,663 | Bond | Nov. 22, 1955 |